United States Patent [19]

Burris

[11] 4,193,815

[45] Mar. 18, 1980

[54] GILSONITE EMULSION COMPOSITIONS

[76] Inventor: Michael V. Burris, 723 S. Third St., Las Vegas, Nev. 89101

[21] Appl. No.: 912,357

[22] Filed: Jun. 5, 1978

[51] Int. Cl.² ............... C08L 1/00; C08L 95/00; C09D 3/24
[52] U.S. Cl. ................... 106/202; 106/31; 106/32; 106/277; 106/282; 106/311
[58] Field of Search ............ 106/277, 31, 32, 202, 106/282

[56] References Cited

U.S. PATENT DOCUMENTS

| | | | |
|---|---|---|---|
| 2,738,287 | 3/1956 | Eisenhut et al. | 106/202 |
| 3,956,002 | 5/1976 | Moorer | 106/277 |
| 4,073,659 | 2/1978 | Burris | 106/277 |

FOREIGN PATENT DOCUMENTS 489432  1/1953  Canada .................................. 106/31

*Primary Examiner*—Allan Lieberman
*Attorney, Agent, or Firm*—Seiler & Quirk

[57] ABSTRACT

Emulsion compositions containing substantial amounts of gilsonite consist essentially of a gilsonite phase consisting of a mixture of between about 33 and about 95% gilsonite, and a petroleum hydrocarbon having a boiling point above about 450° F., and a water phase consisting essentially of water and a small amount of emulsifying agent.

8 Claims, No Drawings

GILSONITE EMULSION COMPOSITIONS

BACKGROUND OF THE INVENTION

In the production of insulation board, it is common to incorporate a blown asphalt binder with the wood particulate matter, usually in the form of sawdust, shavings, etc. In such a process, the asphalt is melted, usually at temperatures of above 225° F., and the molten material is solidified by being injected into cold water. The solidifed asphalt is then crushed and added to a slurry of wood or other cellulosic particles. Obviously substantial energy is required to heat the asphalt and maintain it in the molten state during such a procedure. It is to the elimination of using a molten asphalt and the heating and energy uses that the present invention is directed.

SUMMARY OF THE INVENTION

In the present invention there are proposed gilsonite emulsion compositions, particularly useful in the production of insulation board, which emulsions can be conveniently added to a slurry of the wood fiber materials and homogeneously dispersed or mixed therewith, without the necessity of forming and maintaining a melt of asphalt. In the preferred embodiment, an emulsion composition consists of a gilsonite phase having up to 95%, by weight, gilsonite, and a petroleum hydrocarbon having a boiling point above about 450° F., together with a water phase consisting essentially of water and a small amount of emulsifying agent.

DETAILED DESCRIPTION OF THE INVENTION

Compositions of this invention, for some uses, comprise an emulsion consisting essentially of gilsonite, water and a small amount of emulsifying agent, without other materials. The amount of gilsonite present is between about 25 and about 75% by weight of the total emulsion composition. The emulsifying agent may be a cationic, anionic, and/or nonionic emulsifier. Suitable cationic emulsifiers are preferably selected from the group consisting of quaternary ammonium halides, amine acetate salts and alkyl-substituted imidazolines. The specific emulsifiers within this group, and a number of other examples of compounds, as well as commercially available compositions, are described in my U.S. Pat. No. 4,073,659, the full description thereof being incorporated herein by reference. However, other cationic emulsifiers known to those skilled in the art may be used.

Where it is desirable to use anionic emulsifiers, such materials include petroleum sulfonates, specifically alkaryl sulfonates such as alkali metal salts of methylnaphthalene sulfonate, p-dodecylbenzene sulfonate, mixtures of petroleum sulfonates, and the like, or sulfates such as n-hexadecyl sulfate, and the like. Suitable soap-type emulsifying agents include alkali metal sales of higher fatty acids, especially those having at least 8 carbon atoms in the molecule such as lauric, myristic, palmitic, oleic, ricinoleic, linoleic acids and the like, and mixtures of acids available from animal or vegetable oils, well known to those skilled in the art. Nonionic emulsifying compositions include materials having long chains of polyoxethylene or polyoxypropylene in fatty acid, alcohol, amide or amine molecule. More specific nonionics are disclosed in my copending application Ser. No. 726,946, filed Sept. 27, 1976, and are incorporated herein by reference. For certain uses, mixtures of these above noted types of synthetic detergents or soaps may be used.

The amount of emulsifier used will normally be between about 0.05 and about 5%, of the total composition weight. Usually amounts of 0.5 and about 2% by weight will be suitable. It may also be desirable to substitute or incorporate bentonite clay in the emulsion composition, useful as an emulsifying additive or stabilizer for the emulsion composition. Normally the use of bentonite as a portion of the emulsifier amount as described herein will suffice. However, when used alone, the bentonite may be used in greater amounts, for example, up to 10% by weight, such as between about 3% and about 8% by weight of the emulsion.

Although for some compositions only the emulsion of gilsonite may be useful, it is preferred that the oil of the composition contain a petroleum hydrocarbon having a boiling point above about 450° F. By such a limitation, it is intended to exclude the lower boiling petroleum hydrocarbons such as kerosene, naphtha, gasoline, etc. Suitable hydrocarbons include diesel fuel, gas oil, lubricating oils, and the like. Particularly desirable and most preferred are penetration grade asphalts, having a penetration of between about 40 and about 300 dmm at 77° F. (25° C.), 100 g/sec. Such penetrations are based on well known procedures according to ASTM D-5 or ASHO T-49. The amount of petroleum hydrocarbon, and particularly asphalt, which may be combined with gilsonite to produce the gilsonite phase may be varied whereby the gilsonite is present in amounts of between about 33 and about 95% by weight of that phase. It is particularly advantageous to incorporate enough hydrocarbon with the gilsonite to achieve a gilsonite phase melting or softening temperature of less than about 250° F., and preferably between about 210° and about 250° F.

The petroleum hydrocarbon and gilsonite may be blended to produce the gilsonite phase by any convenient method. One such process includes that disclosed in my aforesaid U.S. Pat. No. 4,073,659, in which gilsonite is melted, and the asphalt is heated, and the two materials are then blended at the gilsonite melting point temperature. Such a process description is incorporated herein by reference. Alternatively, the gilsonite is crushed or otherwise treated to achieve a particle size range which is easily physically mixed with the hydrocarbon by stirring or other similar agitation, without the use of heat to melt the gilsonite. It is this gilsonite phase that is then used to form the emulsion. The preferred gilsonite used herein is a "selects" grade, having a nominal melting or softening point above 300° F. and often about 310°–320° F. Such a gilsonite is distinguished from a "brilliant black" grade having a softening point above about 385° F.

The emulsion is prepared by blending the gilsonite phase with the water phase in which has been incorporated the emulsifying agent. The materials are then thoroughly mixed, with or without heating, although heating somewhat prior to mixing and blending in order to further assist emulsion preparation is often desirable. For example, the gilsonite phase may be heated to the point so that it is somewhat workable physically or is plastic, and at the same time the emulsifying containing water phase may also be heated. The two phases are then simply blended until the desired homogenity is obtained. The amount of water used in the total composition may vary widely, but it normally is suitable to have a gilsonite-water phase ratio between about 1:2 and about 3:1, respectively, by weight.

EXAMPLE

The following composition illustrates an emulsion prepared according to the invention.

Gilsonite ore is mixed with asphalt having a penetration of 45 and a melting point of 120° F. The relative proportions of the two materials were 45% asphalt and 55% gilsonite, blended to achieve a gilsonite phase having a melting point of about 235° F. This phase composition was blended with water containing cationic emulsifier Armack E-5 (dodecyl trimethyl ammonium chloride) having a concentration of about 1% by weight of the total composition. The gilsonite: water phase ratio was about 1:1.

Compositions of the scope of the present invention, although particularly useful in the process for producing insulation board, as previously described, have other uses, such as in preparing printing inks. Other uses for such compositions within the purview of the invention may be evident to those skilled in the art.

I claim:
1. An emulsion composition consisting essentially of
   (a) a gilsonite phase consisting of a mixture of between about 33 and about 95% gilsonite, and a petroleum hydrocarbon having a boiling point above about 450° F. selected from the group consisting of diesel oil, gas oil, lubricating oil and asphalt, and
   (b) a water phase consisting essentially of water and between about 0.05 and about 5%, by weight, of an emulsifying agent and wherein the gilsonite:water phase ratio is between about 1:2 and about 3:1, respectively, by weight.
2. The composition of claim 1 wherein the amount of gilsonite is between about 25 and about 75% by weight of the total composition.
3. The composition of claim 1 wherein the emulsifying agent includes bentonite clay.
4. The composition of claim 1 wherein said emulsifying agent is cationic or anionic.
5. The composition of claim 1 wherein said gilsonite phase has a melting point of between about 210° and about 250° F.
6. The composition of claims 1 or 5 wherein said petroleum hydrocarbon comprises asphalt having a penetration between about 40 and about 300 dmm at 77° F.
7. A composition for producing an insulation board comprising cellulosic particles and an emulsion composition of claim 1 or 5.
8. An emulsion composition consisting essentially of
   (a) a gilsonite phase consisting of a mixture of between about 33 and about 95% gilsonite, and a petroleum hydrocarbon having a boiling point above about 450° F. selected from the group consisting of diesel oil, gas oil, lubricating oil and asphalt, and
   (b) a water phase consisting essentially of water and between about 0.05 and about 10%, by weight, bentonite clay.

* * * * *